United States Patent [19]

Hollingsworth

[11] Patent Number: 4,856,801
[45] Date of Patent: Aug. 15, 1989

[54] INTEGRAL REAR WHEEL SUSPENSION FOR COMPOSITE MATERIAL BICYCLE FRAME

[75] Inventor: Ritchie D. Hollingsworth, Fair Oaks, Calif.

[73] Assignee: Cycle Composites, Inc., Watsonville, Calif.

[21] Appl. No.: 133,562

[22] Filed: Dec. 16, 1987

[51] Int. Cl.⁴ ............................................. B60K 25/04
[52] U.S. Cl. ..................................................... 280/284
[58] Field of Search ................... 280/281 R, 288, 284, 280/285, 275

[56] References Cited

U.S. PATENT DOCUMENTS

| | | | |
|---|---|---|---|
| 2,283,671 | 5/1942 | Finlay et al. | 280/284 |
| 2,446,731 | 8/1948 | Wheler | 280/284 |
| 3,133,748 | 5/1964 | Gunnerson | 280/284 |
| 3,833,242 | 9/1974 | Thompson, Jr. | 280/281 R |
| 4,657,795 | 4/1987 | Foret | 280/281 R |

FOREIGN PATENT DOCUMENTS

| | | | |
|---|---|---|---|
| 2458445 | 2/1981 | France | 280/281 R |
| 2550154 | 2/1985 | France | 280/281 R |
| 369742 | 3/1939 | Italy | 280/281 R |
| 9254 | 6/1887 | United Kingdom | 280/281 R |

Primary Examiner—John A. Pekar
Attorney, Agent, or Firm—Rosenblum, Parish & Bacigalupi

[57] ABSTRACT

A composite material bicycle frame having a single, cantilevered rear wheel suspension member. The rear wheel suspension member is integrally formed into the composite material bicycle frame and is formed with an elliptical cross-section having the major axis thereof disposed horizontally. The elliptical cross-section provides in-plane flexibility to the rear wheel suspension and out-of-plane rigidity. Internal and external vibration dampening devices are provided to dampen rear wheel vibration.

19 Claims, 6 Drawing Sheets

INTEGRAL REAR WHEEL SUSPENSION FOR COMPOSITE MATERIAL BICYCLE FRAME

BACKGROUND OF THE INVENTION

1. Field of the Invention

The present invention relates to bicycle frames and more particularly to rear wheel suspension systems for bicycle frames composed of composite materials.

2. Description of the Prior Art

To control any wheeled vehicle, such as a bicycle, the wheels must stay in contact with the surface of the road. This is relatively easy to accomplish on a smooth surface. However, on a rough surface, such as a dirt road or trail, keeping the wheels in contact with the road becomes more difficult and typically requires an elaborate suspension system. Motorcycles have had such elaborate suspension systems for decades, and even a few of these motorcycle suspension systems have been adapted for use on bicycles. These suspension systems, due to the number of moving parts and joints required for them to function, are heavy and complicated. Bicycles are human-powered. A very strong rider can produce only approximately one-half horsepower for short periods of time, and on numerous occasions a rider is forced to push or even carry his bicycle over inhospitable terrain. With the relatively low available horsepower and the need to, on occasion, carry the bicycle, weight becomes an important factor when considering the viability of a bicycle rear wheel suspension system.

Recently, bicycle frames composed of composite materials have been developed. Such bicycle frames are particularly strong yet lightweight. The peculiar mechanical features of composite materials, such as the possible non-circular cross-sectional shapes of frame members and the orientation of the fiber materials which are included within the composite material forming the frame member, are utilized in the instant invention to produce the rear wheel suspension system described and claimed herein.

SUMMARY OF THE INVENTION

It is an object of the present invention to provide a bicycle rear wheel suspension system for off-road use.

It is another object of the present invention to provide a bicycle rear wheel suspension system which is lightweight and adds no additional weight to the frame.

It is a further object of the present invention to provide a bicycle rear wheel suspension system that urges the rear wheel into contact with the surface of the road or trail over a wide range of surface conditions.

It is yet another object of the present invention to provide a bicycle frame composed of composite materials which suspends the rear wheel in a cantilevered manner.

It is yet a further object of the present invention to provide a bicycle frame formed of composite materials wherein the fiber orientations of the composite materials produce a rear wheel suspension member having significant flexibility in the plane of the bicycle frame and relative inflexibility transverse to the plane of the bicycle frame.

The bicycle frame of the present invention is formed with cantilevered members that support the rear wheel. The bicycle frame is composed of composite materials and the cantilevered portion is formulated from the composite materials in such a manner that a relatively high degree of flexibility of the cantilevered rear wheel support members exists in the plane of the bicycle frame, whereas a relatively high degree of inflexibility exists in the cantilevered rear wheel support members transverse to the plane of the frame. The cantilevered rear sheel suspension member is formed with an elliptical cross-section wherein the major axis of the elipse is horizontally disposed and the minor axis of the ellipse is vertically disposed. The composite materials utilized in the cantilevered rear wheel suspension member portion of the frame include longitudinal fibers of a high strain variety oriented along the longitudinal axis of the member. The off-axis fibers of the cantilevered suspension member are preferably of a high modulus low strain to failure variety and may be oriented at a relatively high angle with respect to the longitudinal fibers. The flexing characteristics of the composite material forming the cantilevered suspension member may be dampened by utilizing fibers, cores and resin matrix systems having inherent damping characteristics.

It is an advantage of the present invention that it provides a bicycle rear wheel suspension system for off-road use.

It is another advantage of the present invention that it provides a bicycle rear wheel suspension system which is lightweight and adds no additional weight to the frame.

It is a further advantage of the present invention that it provides a bicycle rear wheel suspension system that urges the rear wheel into contact with the surface of the road or trail over a wide range of conditions.

It is yet another advantage of the present invention that it provides a bicycle frame composed of composite materials which suspends the rear wheel in a cantilevered manner.

It is yet a further advantage of the present invention that it provides a bicycle frame formed of composite materials wherein the fiber orientations of the composite materials produce a rear wheel suspension member having flexibility in the plane of the bicycle and relative inflexibility transverse to the plane of the bicycle frame.

The foregoing and other objects, features and advantages of the present invention will be apparent from the following detailed description of the preferred embodiments which make reference to the several figures of the drawing.

DESCRIPTION OF THE PREFERRED EMBODIMENTS

Figure 1:
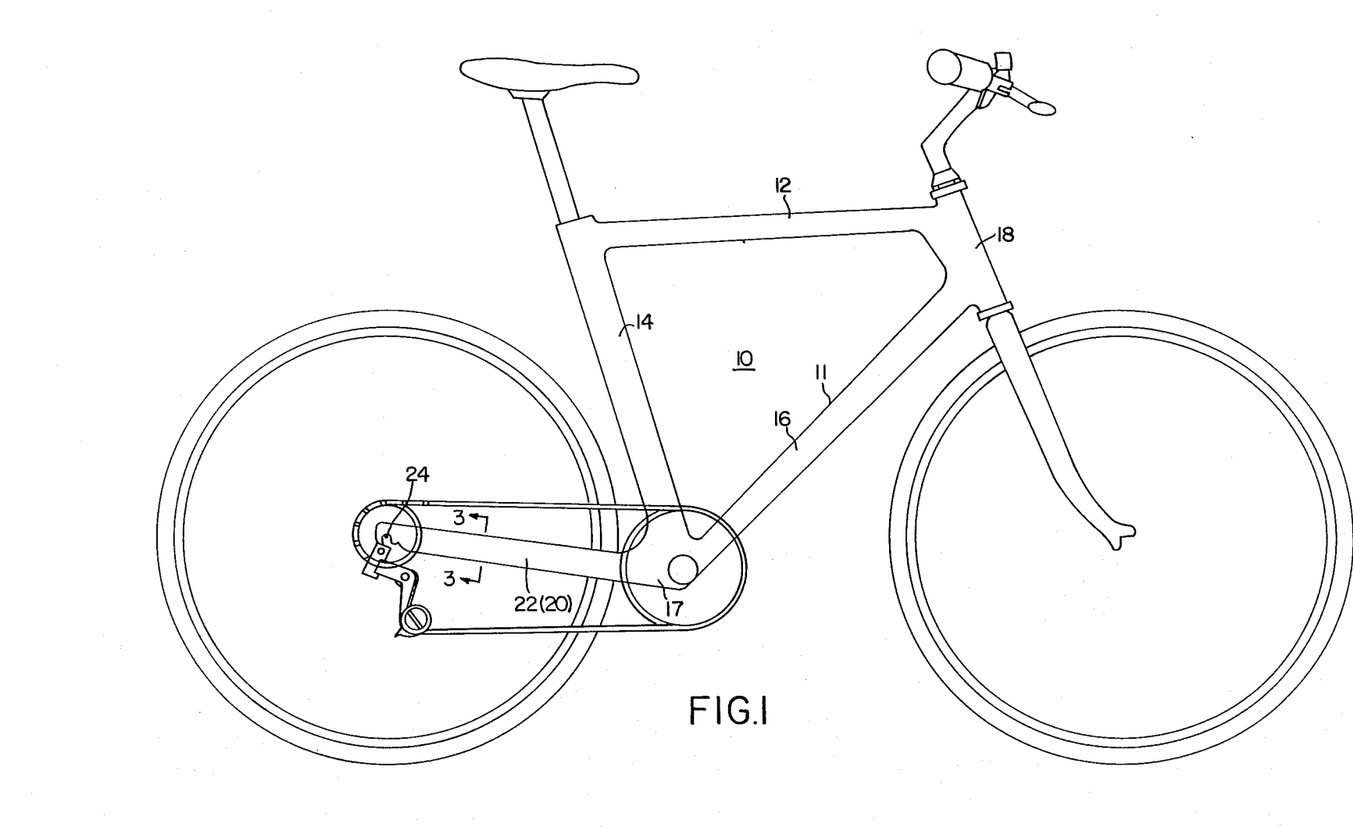
FIG. 1 is a side elevational view of a bicycle utilizing a first preferred embodiment of the bicycle frame of the present invention.
Figure 2:
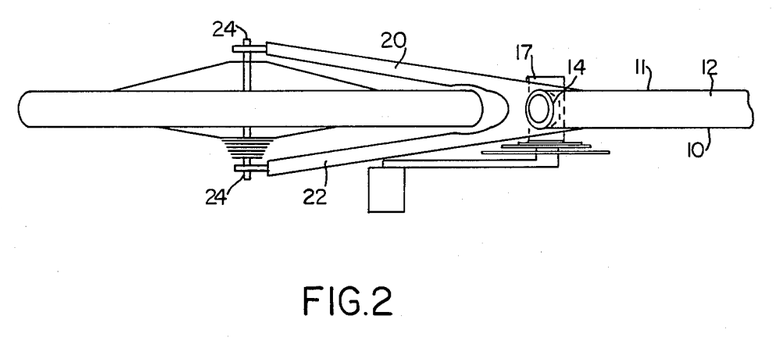
FIG. 2 is a top plan view of the bicycle frame depicted in FIG. 1.

In the preferred embodiment, the bicycle frame 10 is formed as a single integral unit composed of composite materials. As depicted in FIGS. 1 and 2, the bicycle frame 10 of a preferred embodiment of the present invention includes the standard triangular main frame 11 of a men's bicycle including top tube 12, seat tube 14, down tube 16 and the head tube 18. The support structure for the rear wheel includes a pair of cantilevered rear wheel suspension members 20 and 22 which are substantially stronger than the standard chain stays of prior art bicycle frames. The suspension members 20 and 22 are fixedly engaged to and cantilevered from the rearward side of the seat tube 14 at a location proximate the bottom bracket 17 which holds the pedal bearings. As will appear hereinafter, the location along the seat tube 14 from which the suspension members 20 and 22 are cantilevered is not to be limited to locations proximate the bottom bracket 17.

The cantilevered nature of the suspension members 20 and 22 allows for significant bending flexibility in the rear wheel suspension, such that the rear wheel is urged into increased contact with the surface of rough terrain such as dirt roads or trails. Such a suspension system thereby permits greater control to the rider by increasing wheel contact with the surface being traversed.

It is therefore to be realized that a missing element from the present bicycle frame invention 10 relative to typical prior art bicycle frames are the seat stays of the prior art which normally are engaged at one end proximate the upper portion of the seat tube 14 and depend downwardly to engagement at the other end with the chain stay members proximate the joinder thereof with the axle 24 of the rear wheel. Thus, no seat stays are required in this device. The seat stays of the typical prior art bicycle frame serve to stiffen the rear wheel suspension of the frame, whereas the present invention seeks to provide flexibility in the rear wheel suspension.

In the preferred embodiment of the present invention 10 the suspension members 20 and 22 must provide movement or compliance in the plane of the bicycle frame only. Out-of-plane movement of the suspension members 20 and 22 must be minimized so as to not adversely affect the handling of the bicycle. This combination of movement is achieved in the preferred embodiment of the present invention 10 through the employment of an elliptical cross-section for the suspension members 20 and 22, and the purposeful selection of the components of the composite materials forming the suspension members 20 and 22, including the type of fibers utilized, and the fiber orientations and properties. The resilient motion of the members 20 and 22 may be further enhanced and controlled by tapering the cross-sectional dimensions of the members 20 and 22 throughout their length. Such a taper proceeds from a relatively thick portion proximate the joinder of the members 20 and 22 with the seat tube 14, to a relatively thin portion proximate the distal end of the members where the joinder with the rear wheel axle is formed.

Figure 3:
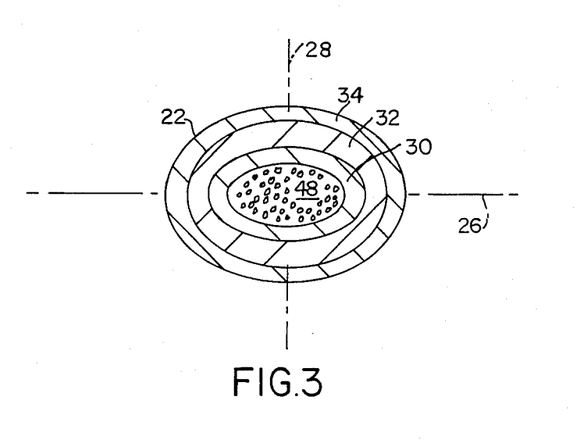
FIG. 3 is a cross-sectional view taken along Lines 3—3 of FIG. 1.

FIG. 3 depicts a cross-sectional view of rear wheel suspension member 22, taken along lines 3—3 of FIG. 1. It is to be understood that rear wheel suspension member 20 is formed identically. As depicted in FIG. 3, the major axis 26 of the ellipse is disposed horizontally and the minor axis 28 of the ellipse is disposed vertically. In the preferred embodiment, the thickness of member 22 along the major axis 26 is approximately 2.5 centimeters, and the thickness of member 22 along the minor axis is approximately 1.8 centimeters. However, the invention is not to be limited to these approximate dimensions.

Figure 4:
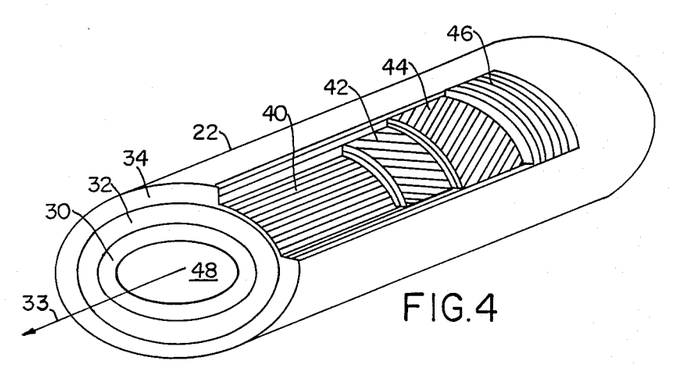
FIG. 4 is a partially cutaway view of a rear wheel suspension member of the present invention.

FIGS. 3 and 4 illustrate a preferred embodiment of the fiber material orientations of the invention. In FIG. 4, a cutaway view of one of the layers is illustrated. In the preferred embodiment, the suspension member 22 is formed with three layers 30, 32, 34 of composite materials. Each layer 30, 32 and 34 includes a plurality of plies of fiber material oriented at differing angles with respect to each other. As depicted in FIG. 4, layer 34 includes sublayer 40 which is composed of four plies of fiberglass fibers oriented at an angle of 0 degrees with respect to the longitudinal axis 33 of the member 22, followed by sublayer 42 which includes six plies of carbon fiber oriented at an angle of approximately plus 20 degrees with respect to the longitudinal axis 33 of the member 22, followed by sublayer 44 which includes six plies of carbon fibers oriented at an angle of approximately minus 20 degrees with respect to the longitudinal axis 33 of the member 22, followed by sublayer 46 which includes one ply of carbon fibers oriented at an angle of approximately 90 degrees with respect to the longitudinal axis 33 of the member 22. In this preferred embodiment, each of the layers 30, 32 and 34 is formed with an identical sequence of sublayers having the identical makeup of plies of material. The resulting member 22 will include 51 plies of material having a thickness of approximately 6.4 millimeters.

Of course, the number of layers of fiber materials, as well as the number of sublayers within each layer, and the number and composition and angle of the plies within each sublayer, may be varied, and such variations are within the scope of the present invention. Thus, any of the plies of any of the layers may be formed from fiber materials such as fiberglass, carbon, Kevlar, Spectra, silicon carbide or other materials. Kevlar is a registered trademark of DuPont Company for polyamide fibers. Spectra fibers are made of polyethylene and are available from Allied Fibers Division of Allied Signal Company, Petersburg, Va. The angle between the intermediate sublayers, such as 42 and 44, may vary from approximately 45 degrees to approximately 10 degrees, and such variation will affect the suspension properties of the member 22.

In the preferred embodiment of the present invention, the member 22 may also include a foam core 48. A core 48 formed of a dense yet flexible material such as polyurethane foam will serve to further dampen the springlike motion of the cantilevered member 22.

The preferred method for manufacturing the suspension members 20 and 22 is to build up the layers 30, 32 and 34 upon a mandrel that has an elliptical cross-section corresponding to the core 48. After the layers 30, 32 and 34 have been built up, the uncured suspension member 20 is placed within a composite material mold, as is well-known in the prior art, and layers of fabric material are interlaid within the fabric layers that form the down tube 16, bottom bracket 17 and seat tube 14 in order to form a strong, bonded engagement therewith to support the cantilevered members 20 and 22.

Figure 5:
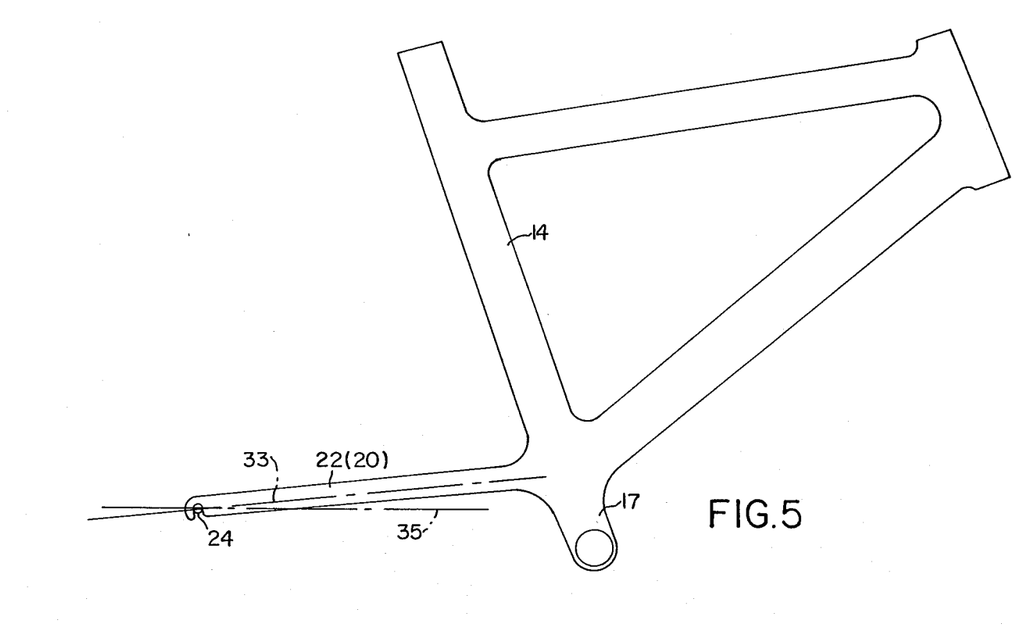
FIG. 5 is a side elevational view of a modified bottom bracket as depicted in FIG. 1.

FIG. 5 depicts a side elevational view of a modification of the joinder of the suspension members 20 and 22 proximate the bottom bracket 17 of FIG. 1. As depicted in FIG. 5, the suspension members 20 and 22 are cantilevered from the seat tube 14 at a location above the bottom bracket 17. In this preferred embodiment, the longitudinal axis 33 of member 20 depends downwardly relative to the horizontal 35 from the joinder of the members 20 and 22 with the seat tube 14 toward the rear wheel attachment point 24. The suspension members 20 and 22 are therefore angled downwardly, which apparently has a positive effect on the handling of the bicycle when the rear wheel strikes a bump in roadway.

Figure 6:
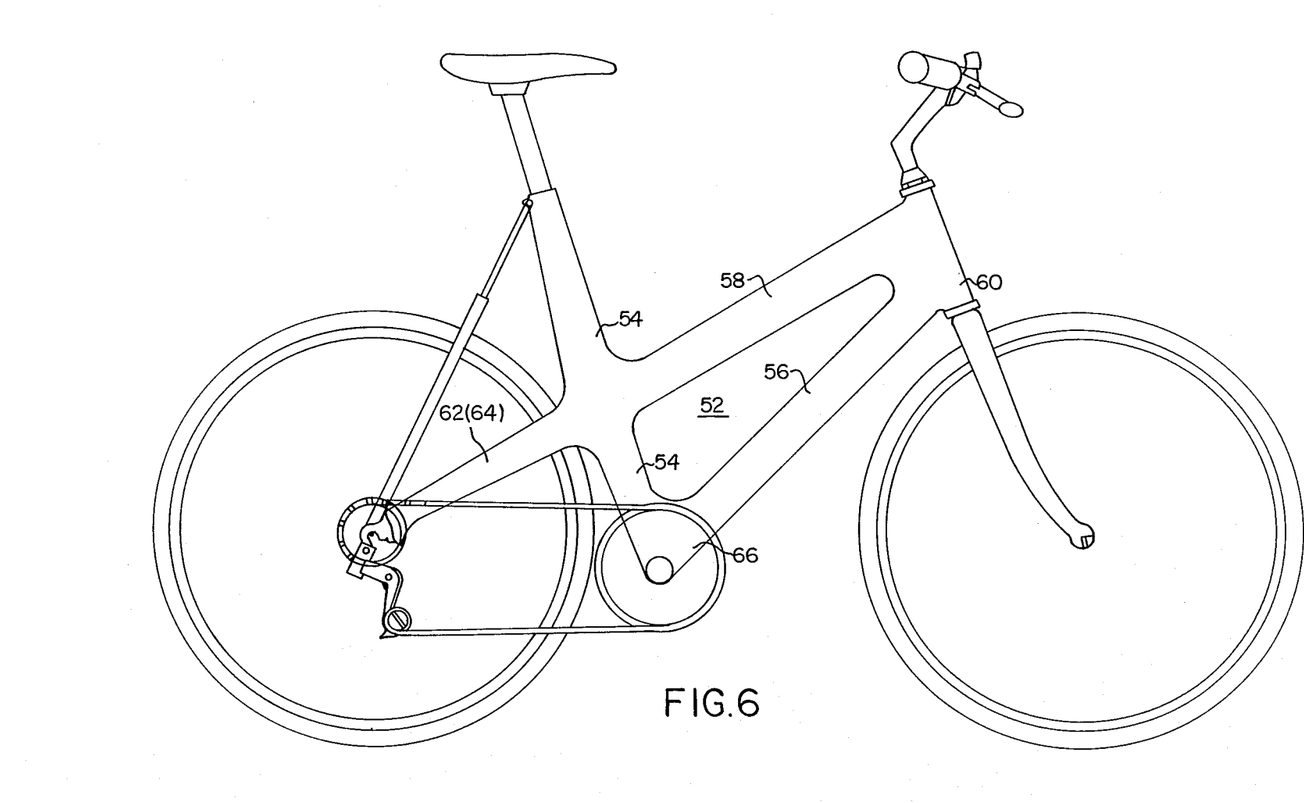
FIG. 6 is a side elevational view of a bicycle utilizing a second preferred embodiment of the bicycle frame of the present invention.

FIG. 6 depicts a second preferred embodiment 50 of the present invention. The bicycle frame of FIG. 6 includes the standard frame elements of a modified main triangle 52 being formed by a seat tube 54, a down tube 56, a top tube 58, a head tube 60, and a bottom bracket 66. As with the preferred embodiment 10 depicted in FIGS. 1 and 2, two suspension members 62 and 64 are cantilevered from the seat tube 54 to act as the sole suspension for the rear wheel. As depicted in FIG. 6, the suspension members 62 and 64 are cantilevered from the seat tube 54 at a location approximately where the top tube 58 joins the seat tube 54. While the suspension members 62 and 64 could also be cantilevered from the seat tube 54 at a location proximate the bottom bracket 17, as is depicted in FIGS. 1 and 5, a simplified and apparently stronger frame is created by moving the joinder of the cantilevered members 62 and 64 away from the joinder of the down tube 56 with the bottom bracket 66. Thus, the present invention is not to be limited to the location of the point from which the rear wheel suspension members are cantilevered.

As with the embodiment depicted in FIG. 1, the cantilevered rear wheel suspension members 62 and 64 provide relatively high flexibility in the plane of the bicycle frame 50 and relatively high inflexibility transverse to the plane of the frame 50. In this preferred embodiment, the frame 50 is integrally formed as a single unit from composite materials. The makeup and fiber orientation of the composite materials forming the suspension members 62 and 64 is such as to promote the flexibility characteristics, and a detailed description of the composite material formulating the suspension members 62 and 64 is provided hereinabove.

Figure 7:
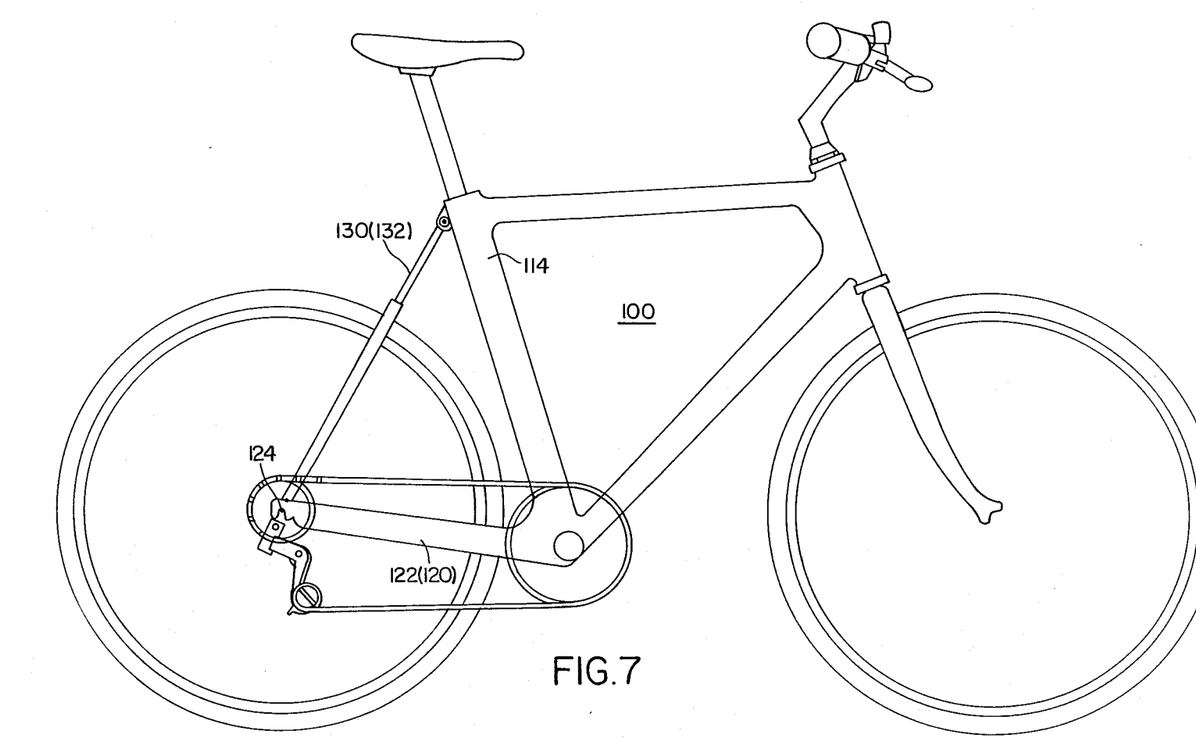
FIG. 7 is a side elevational view of a bicycle utilizing yet another embodiment of the present invention.

FIG. 7 discloses an augmented preferred embodiment 100 of the frame 10 depicted in FIGS. 1, 5 and 6. As is depicted in FIG. 7, the frame 100 is identical to the frame 10 with the inclusion of a pair of shock absorber bars 130 and 132. Each shock absorber bar 130 and 132 is engaged at one end thereof to the seat tube 114 at a location proximate the upper end of the seat tube 114, and depends downwardly to engagement at the other end thereof with one of the suspension members 122 or 120 proximate the rear axle engagement point 124 of said suspension members. The shock absorber bars 130 and 132 are formed as damping or shock absorber members and are utilized to damp out the in-plane flexing of the suspension members 122 and 120 as the rider traverses rough terrain. The shock absorber bars 130 and 132 may be gas-filled or telescoping tubes or formulated from a low compressive material, such that shock absorbing and damping qualities are inherent in the bars 130 and 132.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What I claim is:

1. A bicycle frame formed at least in part of composite material, comprising:
   a rear wheel suspension means being formed of composite materials including a plurality of plies of fibrous material, said plies that form said suspension means being interwoven with plies of composite material forming other portions of said bicycle frame, such that said suspension means is fixedly engaged to said bicycle frame in a cantilevered manner through a continuous composite material interface, said rear wheel suspension means being the only structural support from said rear wheel.

2. A bicycle frame as described in claim 1 wherein said rear wheel suspension means includes two tubular members which depend rearwardly from said bicycle frame proximate the seat tube portion thereof, each said tubular member being disposed on a different side of said rear wheel and formed to engage said rear wheel proximate the axle thereof.

3. A bicycle claim as recited in claim 2 wherein each said tubular member is formed having an elliptical cross-section, wherein the major axis of said elliptical cross-section is disposed horizontally and the minor axis of said elliptical cross-section is disposed vertically.

4. A bicycle frame as recited in claim 3 wherein said tubular members are engaged to said bicycle frame such that the longitudinal axis of said tubular members is disposed downwardly from the engagement point of said tubular members with said bicycle frame to the distal end of said tubular members which is formed for engagement with said rear wheel axle.

5. A bicycle frame as recited in claim 4 wherein said composite material comprising said tubular member is arranged in a plurality of layers, each said layer having a plurality of sublayers and each said sublayer comprising at least one ply of fibrous material;
   wherein one said sublayer includes fibers disposed along the longitudinal axis of said tubular member, and wherein a second of said sublayers includes plies disposed at an angle of from 10 degrees to 45 degrees relative to said longitudinal axis of said tubular member, and wherein a third of said sublayers includes plies disposed at an angle of from minus 10 degrees to minus 45 degrees relative to said longitudinal axis of said tubular member, and wherein a fourth of said sublayers includes plies disposed at an angle of approximately 90 degrees relative to said longitudinal axis of said tubular member.

6. A bicycle frame as described in claim 5 wherein said plies are composed of fibrous materials formed from one or more of the materials included in the group consisting of fiberglass, carbon, Kevlar, Spectra, silicon carbide.

7. A bicycle frame as recited in claim 6 wherein said plies of said second and third sublayers are oriented at an angle of approximately plus 20 degrees and minus 20 degrees respectively with respect to the central axis of said tubular member.

8. A bicycle frame as described in claim 7 wherein said tubular member includes a central core being formed of a motion-dampening material.

9. A bicycle frame as described in claim 8 wherein said core material includes polyurethane foam.

10. A bicycle frame as described in claim 9 wherein said tubular members are formed with a varying cross-sectional area throughout the length thereof, such that said tubular members generally taper from the engagement thereof proximate said seat tube to the distal end thereof proximate said rear wheel axis.

11. A bicycle frame as described in claim 10 wherein shock-absorbing members are engaged to each said tubular member proximate the distal end thereof to dampen the motion of said tubular members.

12. A bicycle frame as recited in claim 3 wherein said composite material comprising said tubular member is arranged in a plurality of layers, each said layer having a plurality of sublayers and each said sublayer comprising at least one ply of fibrous material;

wherein one said sublayer includes fibers disposed along the longitudinal axis of said tubular member, and wherein a second of said sublayers includes plies disposed at an angle of from 10 degrees to 45 degrees relative to said longitudinal axis of said tubular member, and wherein a third of said sublayers includes plies disposed at an angle of from minus 10 degrees to minus 45 degrees relative to said longitudinal axis of said tubular member, and wherein a fourth of said sublayers includes plies disposed at an angle of approximately 90 degrees relative to said longitudinal axis of said tubular member.

13. A bicycle frame as described in claim 12 wherein said plies are composed of fibrous materials formed from one or more of the materials included in the group consisting of fiberglass, carbon, Kevlar, Spectra, silicon carbide.

14. A bicycle frame as recited in claim 13 wherein said plies of said second and third sublayers are oriented at an angle of approximately plus 20 degrees and minus 20 degrees respectively with respect to the central axis of said tubular member.

15. A bicycle frame as described in claim 14 wherein said tubular member includes a central core being formed of a motion dampening material.

16. A bicycle frame as described in claim 15 wherein said core material includes polyurethane foam.

17. A bicycle frame as described in claim 16 wherein said tubular members are formed with a varying cross-sectional area throughout the length thereof, such that said tubular members generally taper from the engagement thereof proximate said seat tube to the distal end thereof proximate said rear wheel axis.

18. A bicycle frame as described in claim 17 wherein shock absorbing members are engaged to each said tubular member proximate the distal end thereof to dampen the motion of said tubular members.

19. A bicycle frame as described in claim 18 wherein said shock absorber members are generally tubular members being engaged at one end thereof proximate the upper end of said seat tube and engaged to said tubular members proximate the distal end thereof, wherein said shock absorbing members are formed to absorb compressive loads along the length thereof.

* * * * *